W. L. WALKER.
BATTERY JAR.
APPLICATION FILED MAY 8, 1915.

1,152,247.

Patented Aug. 31, 1915.
5 SHEETS—SHEET 1.

Inventor
William L. Walker

W. L. WALKER.
BATTERY JAR.
APPLICATION FILED MAY 8, 1915.

1,152,247.

Patented Aug. 31, 1915.
5 SHEETS—SHEET 5.

Inventor
William L. Walker;

By [signature]
Attorneys

UNITED STATES PATENT OFFICE.

WILLIAM L. WALKER, OF NEW LONDON, CONNECTICUT.

BATTERY-JAR.

1,152,247.

Specification of Letters Patent.   Patented Aug. 31, 1915.

Application filed May 8, 1915.   Serial No. 26,747.

*To all whom it may concern:*

Be it known that I, WILLIAM L. WALKER, a citizen of the United States, residing at New London, in the county of New London and State of Connecticut, have invented new and useful Improvements in Battery-Jars, of which the following is a specification.

This invention relates to storage batteries, and more particularly to the construction of the jars of the same.

The temperature of storage batteries, when charged, rises due to the generation of heat during the process of charging, with the result that the batteries are often ruined, and it often becomes necessary to interrupt the process of charging to prevent the cell from becoming excessively hot, and especially is this true where a large number or series of jars are used, the jars being packed closely together and no means being provided for carrying off the heat generated.

It is an object of this invention to overcome these difficulties by providing a battery jar with improved means for the circulation of air whereby the jars are thoroughly ventilated, and the heat is dissipated into the surrounding atmosphere. This result is accomplished by providing an outer metal jar, which is preferably of acid-resisting metal and within which an inner jar of a suitable nonconducting material is placed, with corrugated sides whereby air passages are provided between the inner jar and the outer metal jar of the same cell, and between abutting outer jars of different cells when the cells are placed in a battery tank, or the like.

Another object of the invention is to provide the outer corrugated metal jar with means for strengthening the same whereby the jar may possess comparative lightness, and at the same time resist any strain exerted upon it.

Another object of the invention is to provide means in the bottom of the outer metal jar whereby any inequalities therein, or any inequalities in the bottom of the rubber jar, are allowed for so that the rubber jar may rest evenly thereon. This means also serves the purpose of absorbing any shock to which the battery may be subjected whereby breakage of the inner nonconducting jar is prevented.

It is a further object of the invention to provide means whereby the individual cells may be easily removed from a battery tank, or the like.

The above and other objects of this invention are accomplished by the structures shown in the accompanying drawings, in which—

Figure 1:
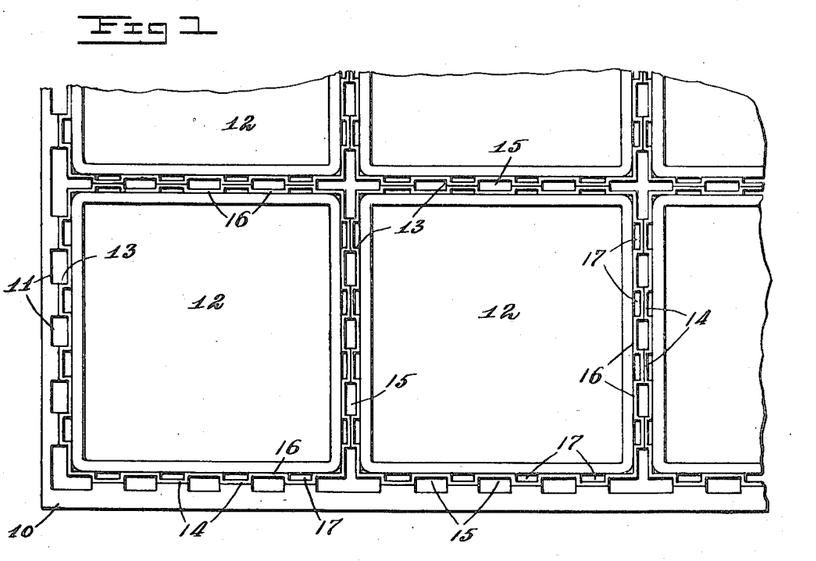
Figure 1 is a top plan view of a number of battery jars constructed in accordance with my invention, the battery jars being shown as situated within a battery tank.

In the drawings, wherein like numerals represent like parts, and referring more particularly to Fig. 1, 10 designates a portion or corner of a battery tank within which are placed my improved battery jars. The battery tank 10 is preferably provided with spaced-apart internal vertical grooves or channels 11 which extend throughout the height of the same. The battery jars comprise an inner jar 12 of any suitable insulating material, such as vulcanized rubber, partially vulcanized rubber, or the like, and an outer jar 13 composed of material possessing the requisite mechanical strength. The outer jar 13 is preferably constructed of a metal having the requisite acid resisting properties, a composition of antimony and lead being admirably adapted for this purpose. Suitable battery plates and an electrolyte or acid, generally sulfuric, are adapted to be placed within the inner rubber jar 12. The metal jar 13 is provided to strengthen the inner rubber jar and to prevent the escape of the electrolyte into the battery tank, should the rubber jar crack or break. The sides of the metal jar 13 are corrugated, so as to provide external vertical ribs 14, and vertical external channels 15 between the ribs. The external ribs of one metal jar when placed in a battery tank are adapted to abut against corresponding ribs of the outer jar of an adjacent cell, or against the ribs of the tank 10, as the case may be, with the channels 15 of the adjacent outer jars registering whereby enlarged air passages are provided between the adjacent cells to allow for the circulation of air therebetween. Also by corrugating the outer metal jar a plurality of vertical internal ribs 16 extending throughout the height of the jar are provided which reinforce or support the sides of the inner jar 12 contained within the metal jar, channels or passages 17 being provided between the ribs 16 whereby air may circulate between the inner surface of the metal jar and the outer surface of the rubber jar. By this construction, I obtain two sets of ventilating spaces, one set being provided between outer jars of adjacent cells, and the other, between the outer and inner jars of the same cell; and, thereby, when heat is generated during the charging of the cell, the circulation of air in these ventilating spaces quickly conducts the same away from the cells. The external ribs 14 of one outer jar are adapted to abut against the corresponding ribs of the adjacent outer jar, and, therefore, one metal jar tends to reinforce the abutting one. The construction of my corrugated jars permits of the individual cells being easily removed from a battery because only half the area of the walls of the jars touch the walls of adjacent cells and therefore the friction is greatly reduced.

Figure 2:
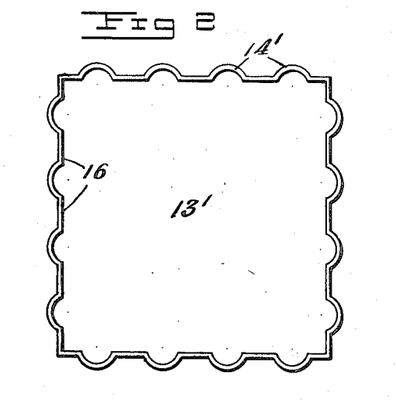
Fig. 2 is a top plan view of a modified form of my improved metal jar.
Figure 3:
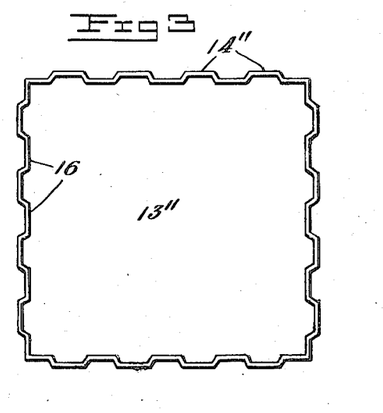
Fig. 3 is a top plan view of another embodiment of the same.

In Fig. 1 the vertical ribs 14 are disclosed as rectangular in cross-section, but, of course, it is to be understood that any form of corrugation may be used, and, if desired, the corrugations may be such as to form a rolling or curved rib 14', as shown in the metal jar 13' of Fig. 2, or the ribs may have the form 14'' shown in the metal jar 13'' of Fig. 3. The jars may be cast with the walls thereof corrugated, or the jars may be formed of corrugated sheet metal.

As the walls of the metal jars are comparatively thin, and as the same are subjected to considerable pressure, it is desirable to reinforce or "stay" the same, so that the jars retain their shape, and the bulging of the jars and the tendency of the corrugations to flatten out are prevented.

Figure 4:
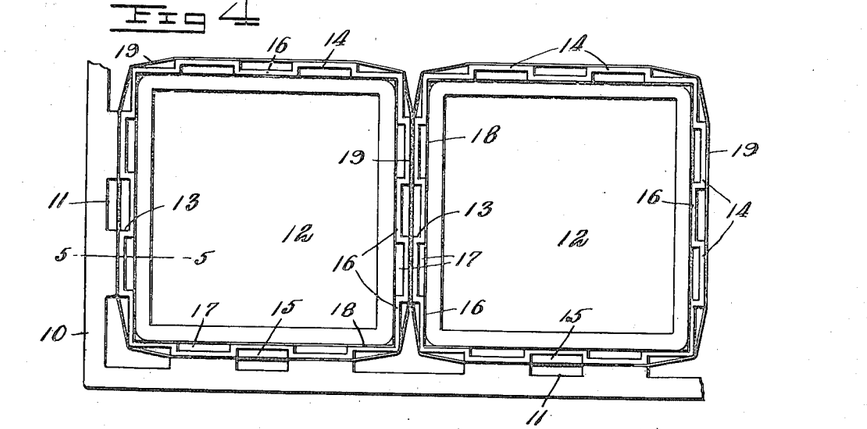
Fig. 4 is a top plan view of two battery jars situated within a battery tank, the jars being provided with my improved means for reinforcing the same.
Figure 5:
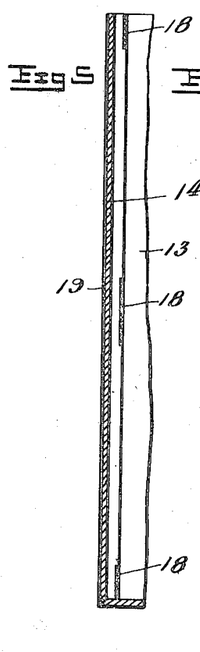
Fig. 5 is a vertical sectional view of the metal jar shown in Fig. 4, and taken on line 5—5 of Fig. 4.

In Figs. 4 and 5, I disclose improved means for reinforcing my metal corrugated jar. The jar 13 is provided with a plurality of strips 18 passing horizontally about the inside of the jar in suitable vertically spaced-apart relation, one of said strips being shown at the top of the jar, a second at the bottom, and a third intermediate the top and bottom, but, of course, any number of strips may be used. The strips 18 are composed of any suitable acid-resisting material, preferably a composition of antimony and lead being used, which are burned, riveted or otherwise attached to the jar, and it is also desirable that these strips be countersunk into the walls of the ribs 16 of the metal jar whereby the outer surfaces of the rubber jars may bear evenly against the internal ribs 16 substantially throughout their height. By this construction, in addition to reinforcing the metal jars, the strips 18 support the rubber jars in the channels and prevent the bulging of the same into the channels, while, at the same time, the strips do not interfere with ventilation. About the exterior walls of the jar 13 is a strip of metal 19 extending throughout the height of the jar. The outer strip 19 may be of any suitable material, and while it is preferable to form the same of a composition of antimony and lead, or other acid-resisting metal, this is not necessary, for should a rubber jar leak, the electrolyte contained within the cell would not come into contact with the reinforcing strip 19.

Figures 6, 7, 8:
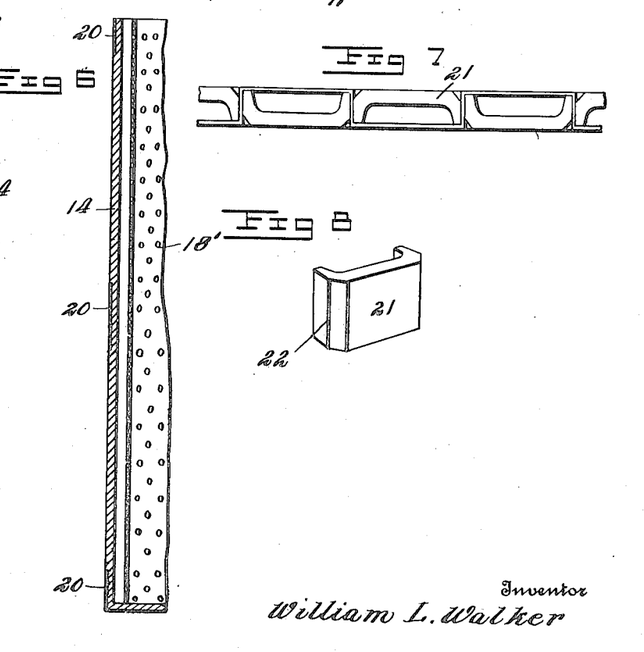
Fig. 6 is a vertical sectional view through one of the walls of my improved metal jar showing modified forms of reinforcement.
Fig. 7 is a top plan view of a portion of a metal jar having another modified form of reinforcement.
Fig. 8 is a perspective view of a portion of the reinforcing members shown in Fig. 7.

The strips 18 and 19 may be burned to the metal jar 13, or they may be riveted thereon, preferably rivets of antimony being used, the rivets being secured through the strips and subsequently a hot flame and additional antimony being applied thereto to form an acid-tight joint. If desired, the outer strip 19 may be made in the form of a sleeve and slipped over the jar 13 without being secured thereto. The strips 18 and 19 may be of relatively thin material, and preferably the grain of the strips is at right angles to the grain of the metal jar 13, it being desired that the grain of the latter run vertically, or in the direction of the height of the jar, and the grain of the strips 18 and 19 run horizontally about the jar. By this construction, a jar of enormous strength is provided, and at the same time the same is comparatively light, and, of course, the reinforcements will not materially interfere with the ventilation of the jars. It is obvious that the metal strip 19 need not extend throughout the entire height of the jar, and the same may be substituted with a plurality of strips 20, which extend about the jar and are spaced from one another in a manner similar to the strips 18 as above described. As shown in Fig. 6, a perforated, continuous reinforcing strip or sheet 18' may be substituted for the inner strips 18 shown in Fig. 5. The jar 12 would bear evenly on the perforated sheet 18' and the perforations would give the necessary ventilation.

Referring to Figs. 7 and 8, the reinforcing members comprise angle braces 21 which are U-shaped in cross-section and are preferably made of cast material, the castings being of a width and depth corresponding to the channels 15 and 17 and having their vertical edges or sides beveled as at 22 to permit the ready burning of the same to the sides of the jar.

Figures 9, 10, 11, 12:
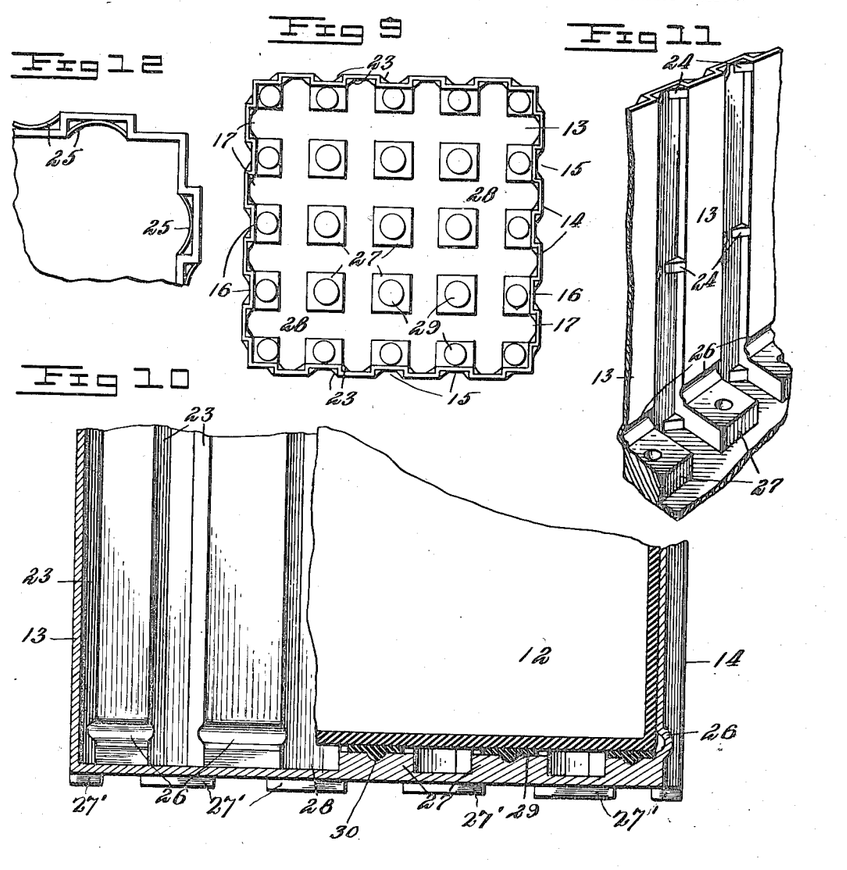
Fig. 9 is a top plan view of my improved metal jar showing modified means for reinforcing the same and showing the jar provided with projections in its bottom.
Fig. 10 is a sectional view of the lower portion of the jar shown in Fig. 9, a rubber jar being disclosed within the metal jar with parts of the former broken away.
Fig. 11 is an interior perspective view of a portion of my improved metal jar showing a slightly different form of reinforcement from that disclosed in Fig. 10.
Fig. 12 is a top plan view of a corner of the metal jar showing a further modified form of reinforcement.

In Fig. 9, the reinforcing members comprise angle braces 23 which are riveted, cast or run into the corners or angles of the air channels on the interior or exterior surfaces of the metal jar, or on both as desired. These angle pieces may extend as shown in Fig. 10, the entire height of the jar, or as disclosed in Fig. 11, they may comprise small braces 24 disposed in suitable spaced-apart relation in the corners of the air channels.

In Fig. 12, the reinforcing members comprise curved braces 25 which are burned or otherwise secured adjacent the corners of the ribs and are connected at their central portions to the ribs.

Figure 13:
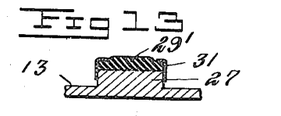
Figs. 13 and 14 are vertical sectional views through the projections in the bottom of the metal jar showing the projections provided with modified cushioning means.
Figure 14:
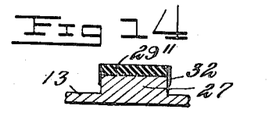

To aid ventilation, means are provided whereby the internal air channels 17 intercommunicate, and as shown in Figs. 10 and 11, this means comprises horizontal grooves 26 extending across the faces of the internal ribs 16. To further facilitate ventilation and insure thorough circulation of air between the inner jar 12 and the outer jars 13, the outer jars 13 are provided in their bottoms with a plurality of projections 27 which support the inner rubber jar, the spaces 28 between the projections serving as passages whereby the channels 17 intercommunicate. Furthermore, should the jar leak, the electrolyte will fill the channels 17 equally as the passages 28 serve as sluice-ways for the electrolyte. To further facilitate the ventilation of batteries in submarines, vehicles, mining locomotives and car lighting equipment, etc., it may be desirable to provide the outer bottoms of the outer jars 13, with projections 27' as shown in Fig. 10. The spaces between the projections 27' serve as passages whereby the external channels 15 intercommunicate. As it is desirable that the rubber jar rest or seat evenly and uniformly upon the projections 26 to prevent breakage of the rubber jars, plugs or cushions 29 of any suitable expansible, or elastic material, such as rubber are provided upon the projections. These cushions 29 serve the further purpose of absorbing any shock to which the rubber jar may be subjected due to the vibration or jarring of the vehicle or vessel upon which the battery is placed. The cushion 29 may have the form disclosed in Figs. 9 and 10 wherein they are shown as circular and as having a spherical projection 30 seating or engaging in a concave or spherical recess in the projections 27. The cushions 29' shown in Fig. 13 are secured to the projections 27 by means of an antimony ring 31, and the cushions 29" shown in Fig. 14 are formed thimble-like with an annular flange 32 fitting over the projection 27.

Figure 15:
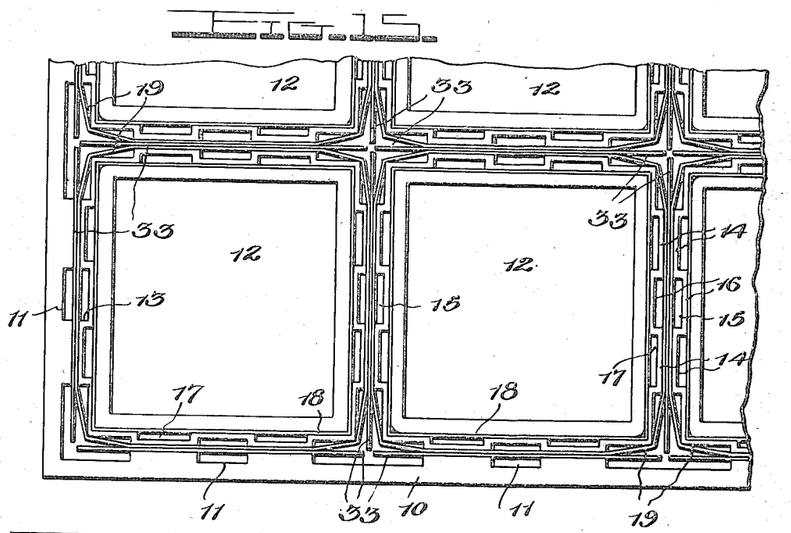
Fig. 15 is a top plan view of a series of jars similar to those disclosed in Fig. 4, spacing members being shown between the jars of adjacent cells.
Figure 16:
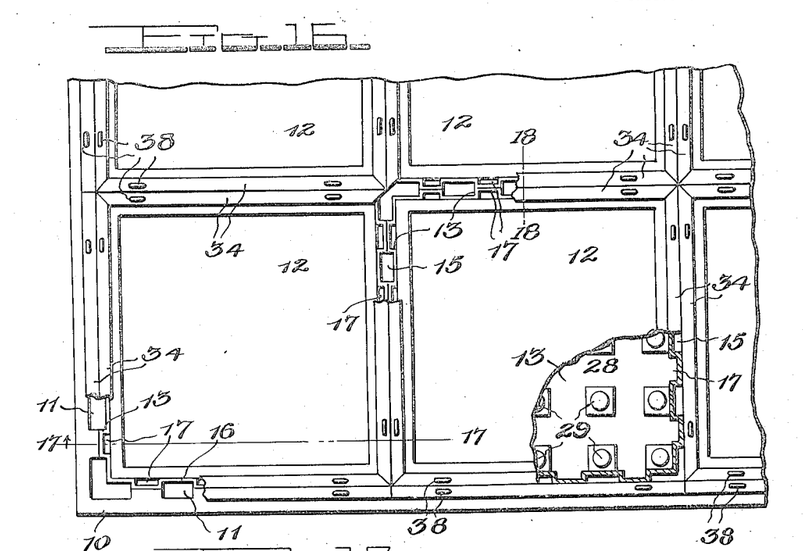
Fig. 16 is a top-plan view of a series of jars provided with means for connecting the air channels of the adjacent cells, parts being broken away.

Referring to Fig. 15, wherein is disclosed a series of battery jars similar to those shown in Fig. 4, it will be seen that spacing members 33 are provided between the jars of adjacent cells. These members 33 comprise thin sheets preferably of suitable acid-resisting material, each of the sheets being substantially equal in area to one side of the jar. It is evident that when it is desired to remove a cell it is merely necessary to withdraw the individual sheets 33 thereby leaving sufficient space around the jars to permit of its easy removal. The sheets 33 being substantially one-fourth the total outside area of the metal sleeve 19, the friction between one of the sheets 33 and the adjacent side of the sleeve 19 is substantially one-fourth that of the friction between the sleeve 19 and the adjacent jars. It is, of course, evident that, while I have shown the spacing members in connection with jars having the surrounding sleeves 19, they are also applicable to the other forms of jars shown.

In Figs. 16 to 21, I disclose means for connecting the internal air passages 17 of adjacent cells, so that a blast of air may be driven through one cell into another, and from one end of the series of battery jars to the other end.

Figure 17:
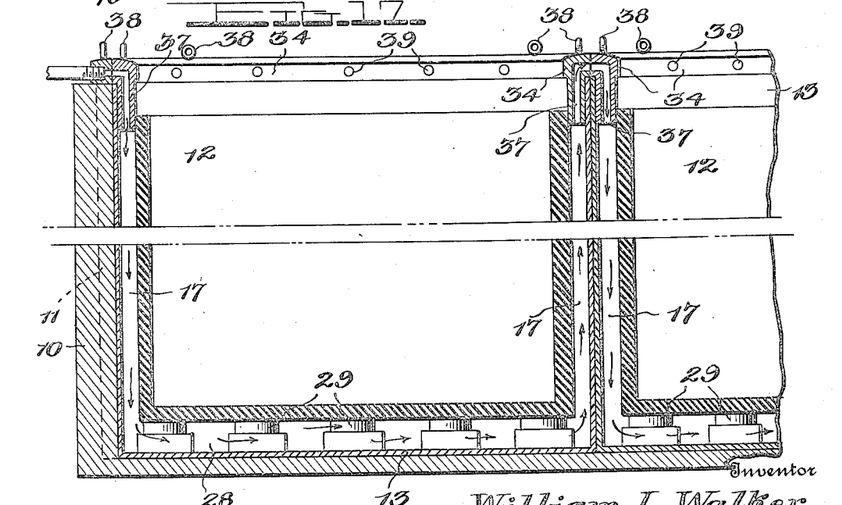
Fig. 17 is a sectional view taken on line 17—17 of Fig. 16.
Figure 18:
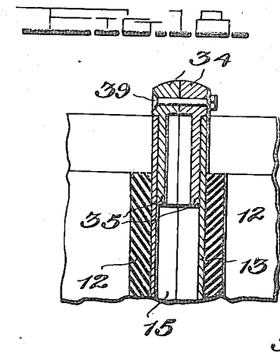
Fig. 18 is a partial sectional view taken on line 18—18 of Fig. 16.
Figure 19:
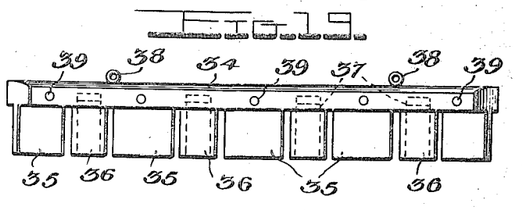
Fig. 19 is an elevational view of one of the blocks for connecting the air channels of adjacent cells.
Figure 20:
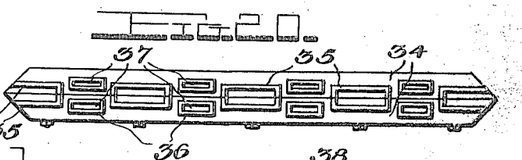
Fig. 20 is a bottom plan view of two opposing blocks secured together.
Figure 21:
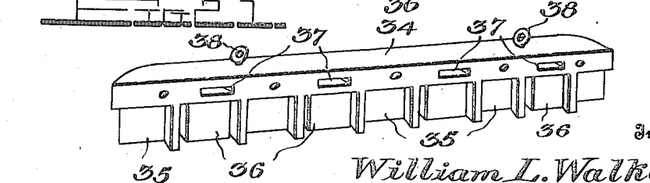
Fig. 21 is a perspective view of one of the blocks looking on the opposite side to that of Fig. 19.

It will be noted that the rubber jars 12, as seen in Figs. 17 and 18, terminate somewhat short of the tops of the metal jars 13, and that the tops of the rubber jars form seats upon which suitable covers (not shown) are adapted to rest. As the cover seats within the metal jar, the tops of the air channels 15 and 17 are open.

At the top edge of each of the metal jars 13, and at each side thereof, I provide blocks or castings 34, preferably of antimony and lead, the blocks being beveled at their ends, so as to make a close joint with the blocks passing along the adjacent sides of the jar. The blocks 34 are provided with a number of depending legs or lugs arranged in staggered relation. The alternate legs or lugs 35, which are preferably cored as shown in Fig. 18, extend into the external channels 15 of the metal jar, while the legs or lugs 36 protrude into the channels 17 between the rubber jar 12 and the metal jar 13 of the same cell. Passing through the legs 36 and opening into the side of the body of the block 34 are through ports 37. The blocks 34 are so formed that when two cells provided with the blocks are placed abutting each other, the legs 35 of the two adjacent blocks abut and the ports 37 of one block register with corresponding ports of the adjacent block as shown in Fig. 17.

As the sluices 28 formed in the bottom of the metal jar 13 are in alinement with the vertical air passages or channels 17 and as the channels 17 of adjacent cells are in communication with each other by means of the passages or ports 37, it will be noted that, by means of a suitable blower, a continuous current of air can be passed or driven through a series of cells between the bottom and sides of the rubber jars and the metal jars as is clearly shown by the arrows in Fig. 17. The blocks 34 may be secured to the jars in any suitable manner, such as by riveting or burning, or that may be merely held thereon by friction, although riveting is probably preferable because by the aid of screw-eyes 38, the entire cell can be lifted by a bar inserted through the screw-eye. The blocks or castings 34 also prevent the cell from collapsing.

In the drawings, the abutting blocks 34 on the tops of the adjacent cells are held together by means of bolts 39. It is, of course, evident, that any suitable means may be provided between the abutting faces of the blocks to prevent leakage therebetween, and that, if preferred, instead of making the abutting blocks of separate members, they may be integral, although the form shown is preferable, as it is less expensive and would expedite the withdrawal of the cells from a battery tank.

My metal jars are generally adapted for use in storage battery work, and are particularly applicable to submarine work where, under the present practice, a number of jars, usually sixty, are closely packed in a storage tank without adequate means of ventilation. They are also especially adapted for use in electric motor vehicles and railroad cars where at the present time no ventilating means is provided, with the result that hundreds of batteries are ruined daily owing to the rise in temperature caused by the heat generated during charging. They may also be advantageously used for mining or other locomotives, yacht lighting and power, car lighting and for central station or other service.

It is, of course, understood that my invention is adaptable to various modifications and changes which would be within the spirit of my invention without departing from the scope of the following claims.

What I claim is,—

1. In a battery, an inner jar, an outer jar, and rib members between said jars to form air passages therebetween.

2. In a battery, an outer jar, an inner jar, and rib members between said jars to form air passages therebetween, and means whereby the air passages intercommunicate.

3. In a battery, an inner jar, and an outer jar having vertical air spaces extending throughout the height of the jar, and also having horizontal grooves whereby the air passages intercommunicate.

4. In a battery, an inner jar, an outer jar, and rib members between the walls of the jars to form vertical air spaces therebetween, said outer jar having horizontal grooves in its walls, and grooves in its bottom whereby the vertical air passages intercommunicate.

5. In a battery, an inner jar of nonconducting acid resisting material, and an outer jar of suitable acid resisting properties about said inner jar for supporting the same, said outer jar being constructed to form air channels between the inner and outer jars.

6. In a battery, an inner jar of suitable nonconducting material, an outer jar of acid-resisting material, and rib members on the interior of said outer jar against which the walls of the inner jar abut, said rib members having horizontal grooves whereby the air channels formed between said rib members intercommunicate, and said outer jar having grooves in its bottom whereby the channels intercommunicate to allow for the thorough ventilation of said battery.

7. In a battery, an inner jar of suitable nonconducting material, an outer jar, internal ribs on said outer jar having channels therebetween, the inner jar being adapted to abut against said ribs, external rib members upon said outer jar having air channels therebetween, the external ribs of one outer jar of one cell being adapted to abut against corresponding ribs of the outer jar of an adjacent cell.

8. In a battery, an inner jar of suitable nonconducting material, an outer jar of suitable acid resisting metal, rib members on the interior of said outer jar against which the inner jar abuts, said rib members having air channels therebetween, and rib members on the exterior of said metal jar and having air channels therebetween, and means for reinforcing said outer metal jar.

9. In a battery, an inner jar of suitable nonconducting material, and an outer jar formed of corrugated metal whereby air passages are provided between the outer and inner jars of the same cell, and air passages are provided between the outer jar of one cell and the outer jar of an abutting cell.

10. In a storage battery, an inner jar of suitable nonconducting material, and an outer jar of corrugated metal, and means for reinforcing said outer jar.

11. In a battery, an inner jar of suitable nonconducting material, an outer jar formed of corrugated metal having the requisite acid resisting properties, and strips passing horizontally about the inner walls of said metal jar to reinforce the same.

12. In a battery, an inner jar of suitable nonconducting material, an outer jar of corrugated metal, a plurality of spaced-apart strips secured to the interior of said metal jar for reinforcing the same and to support the inner jar, said strips being of suitable acid resisting material.

13. In a storage battery, an inner jar of suitable nonconducting material, and an outer jar of acid resisting material, corrugations in the walls of said outer jar to provide air spaces between the outer jar and the inner jar of the same cell, said corrugations also providing air spaces between the outer jar of one cell and the outer jar of the next abutting cell, strips on the interior of said outer jar for reinforcing the same, and strips on the exterior of said outer jar for reinforcing the same, the grain of said strips passing horizontally about said outer jar and at right angles to the grain thereto.

14. In a battery, an inner jar of suitable nonconducting material, an outer jar of corrugated metal, a plurality of strips secured to the inner walls of said outer metal jar for reinforcing the same, and a strip secured to the outside of the outer metal jar and extending throughout its height for reinforcing the same.

15. In a storage battery, an inner jar of suitable nonconducting material, an outer jar of corrugated metal, and a perforated sheet or strip secured to the interior of said metal jar for reinforcing the same and for supporting the inner jar.

16. In a battery, an inner jar of suitable nonconducting material, and an outer jar of corrugated metal, and projections on the bottom of said outer metal jar upon which the inner jar is adapted to rest.

17. In a battery, an inner jar of suitable nonconducting material, an outer jar, projections in the bottom of said outer jar, and cushioning means on said projections on which the inner jar is adapted to rest.

18. In a battery, an inner jar of suitable nonconducting material, and an outer corrugated jar of acid resisting material, projections in the bottom of said outer jar, and shock absorbing cushions of elastic material upon said projections upon which the inner jar is adapted to seat whereby inequalities in the projections, or inequalities in the bottom of the inner jar are taken up.

19. In a series of battery cells, each cell having an inner jar and an outer jar, spaced-apart vertical rib members on the outside of said outer jars and between adjacent cells, and spaced-apart vertical rib members on the inside of said outer jars whereby circulation spaces are provided between the outer jars of adjacent cells, and circulation spaces are provided between the inner and outer jars of the same cell.

20. In a series of battery cells, battery jars provided with external vertical rib members, and spacing members comprising thin sheets between said jars, said sheets being adapted to be removed by gripping the same between said rib members.

21. In a series of battery jars, each jar having its vertical corners depressed, spacing strips between said jars comprising thin sheets of substantially the same area as one side of said jars, said strips extending between the depressed corners of said jars whereby the strips may be easily grasped for removal.

22. In a series of battery cells, each cell having an outer jar and an inner jar, spaced-apart vertical ribs members on the inside of said outer jar whereby circulation spaces are provided between the inner and outer jars of each cell, and means connecting said spaces of adjacent cells for passing a current of air through successive cells.

23. In a series of battery cells, each cell having an inner and outer jar, spaced-apart vertical rib members on the inside of said jar to provide air circulating channels between the outer and inner jars, and a block having legs with air ports therethrough, said legs being adapted to extend into said air circulating channels with the air ports connecting the air channels of adjacent cells.

24. In a storage battery, an inner jar of suitable nonconducting material, and an outer jar formed of corrugated metal whereby air passages are provided between the outer and inner jars of the same cell and air passages are provided between the outer jar of one cell and the outer jar of an abutting cell, a block adapted to seat on the top of said metal jar at each edge thereof, said block having legs adapted to extend into the internal passages and legs adapted to extend into the external passages, said first-mentioned legs having air ports therein, the ports opening in the side of said block, said ports of the blocks of abutting jars being adapted to register whereby the internal channels of adjacent cells intercommunicate.

In testimony whereof I have hereunto set my hand in presence of two subscribing witnesses.

WILLIAM L. WALKER.

Witnesses:
M. R. PIERCE,
R. A. BURG.